United States Patent [19]
Burdick

[11] 3,828,884
[45] Aug. 13, 1974

[54] LOW PROFILE TRANSPORTER

[75] Inventor: Robert E. Burdick, Santa Barbara, Calif.

[73] Assignee: Rolair Systems, Inc., Santa Barbara, Calif.

[22] Filed: Dec. 1, 1972

[21] Appl. No.: 311,293

[52] U.S. Cl. ............................. 180/125, 214/1 BE
[51] Int. Cl. ............................................ B65g 7/06
[58] Field of Search .......... 180/116, 119, 124, 125; 214/1 BE; 280/43.17, DIG. 7

[56] References Cited
UNITED STATES PATENTS

| | | | |
|---|---|---|---|
| 1,297,091 | 3/1919 | Canfield | 254/93 HP |
| 3,185,238 | 5/1965 | Coates | 180/125 |
| 3,239,024 | 3/1966 | Christian | 180/125 |
| 3,400,780 | 9/1968 | Kesling | 180/124 |
| 3,593,817 | 7/1971 | Hawkins | 180/116 X |
| 3,670,838 | 6/1972 | Williamson | 180/124 |

Primary Examiner—David Schonberg
Assistant Examiner—Terrance L. Siemens
Attorney, Agent, or Firm—Harris, Kern, Wallen & Tinsley

[57] ABSTRACT

A transporter movable on an inflatable air bearing member and having a pair of load engagement support blocks positioned on opposite sides of the transporter below the top surface thereof. A control arm extending from the rearward end of the transporter pivots the support blocks to a raised load engagement position extending above the top surface of the transporter.

2 Claims, 5 Drawing Figures

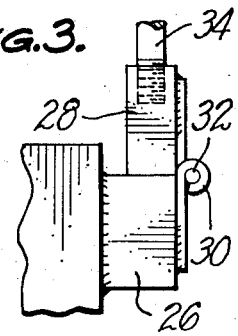
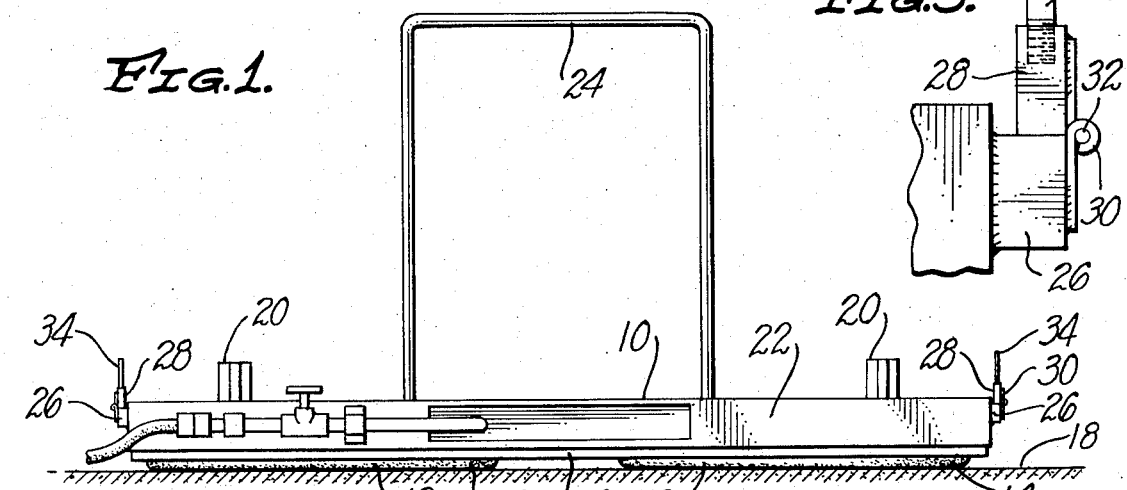
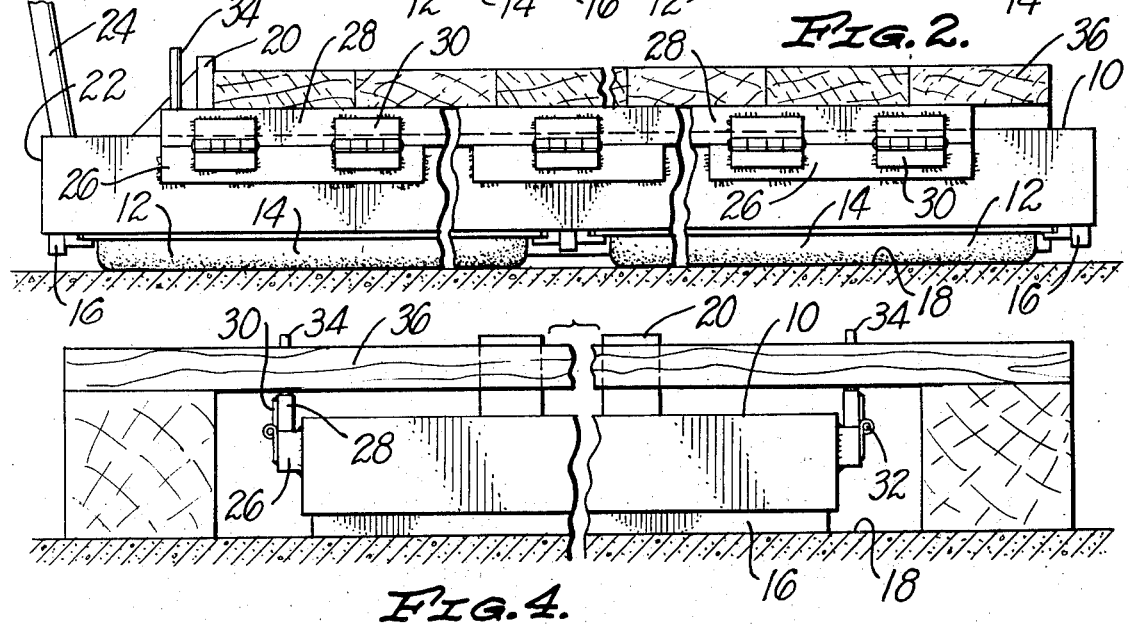
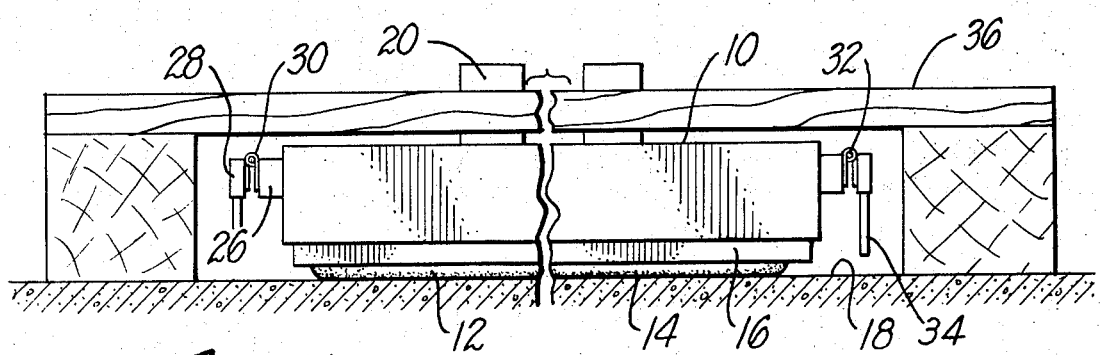

LOW PROFILE TRANSPORTER

This invention relates generally to air cushion transporter devices, and more particularly to a low profile transporter having support blocks which can remain below the top surface of the transporter until raised by a control lever into a load engagement position extending above the top surface of the transporter.

Typical examples of low profile transporters movable on an inflatable air bearing member are shown in the co-pending application of Robert E. Burdick entitled "Replaceable Air Cushion Device," Ser. No. 180,666, filed Sept. 15, 1971, now abandoned, and the co-pending application of Robert E. Burdick and Baxter K. Wolf entitled "Transporter with Built-In Distribution and Damping," Ser. No. 298,464, filed Oct. 18, 1972. Compressed air is delivered to the air bearings which generate a film of air between the transporter and the ground surface resulting in very low friction between the transporter and the ground.

Low profile transporters are typically used for lifting a load having only a small vertical clearance underneath a portion thereof for receiving the transporter. Typical loads include pallets, engine stands, skids, and the like. In normal operation, the transporter is moved on an inflated air bearing member to a desired location under a load while support spacers are in a lowered position. The air is turned off and the support spacers are moved to a raised position while the transporter rests on the deflated air bearing member or adjacent support bars. The air is then turned on and the air bearing member inflated to lift the support blocks into supporting contact with the underside of the load.

In the past load support spacers movable between lowered and raised positions have usually been mounted on the top platform of such transporters, thereby increasing the vertical load clearance needed for allowing the transporter to move on its inflated air bearing member into and away from carrying position underneath the load.

Therefore such prior art support spacers are not suitable for loads having an unusually small vertical access space underneath which allows only the transporter itself to fit without room for any support spacers on top of the transporter platform. The present invention is designed to eliminate the drawbacks of the prior art and provide support blocks which are mounted in position below the top surface of the transporter and which can be raised by a control lever into load engagement position extending above the upper surface of the transporter after the transporter is resting underneath the load More specifically, it is an object of the present invention to provide a pair of support blocks pivotally mounted on opposing outer sides of the transporter, and a control lever connected to the support blocks for moving them through 180° between a lowered position below the top surface of the transporter and an upper position extending above the top surface. Other objects, advantages, features and results will more fully appear in the course of the following description.

In the drawing:

FIG. 1 is an end view of an air cushion transporter incorporating a presently preferred embodiment of the invention.

FIG. 2 is a side view of FIG. 1 showing a transporter on an inflated air bearing member with the support blocks in raised position engaging a load;

FIG. 3 is an enlarged end view of a support block in raised position;

FIG. 4 is an end view showing the transporter resting on a deflated air bearing member underneath a load with the support blocks in raised position; and FIG. 5 is the same view as FIG. 4 showing the transporter moving on an inflated air bearing member under a load with the support blocks in lowered position.

In the illustrated embodiment, the transporter comprises a platform 10 and a conventional air bearing member such as a plurality of air bearings 12 each having a lower flexible diaphragm 14. Bars 16 are carried on the bottom of the platform 10 for supporting the platform on the ground surface 18 when the air bearings are deflated or removed. Vertical stop members 20 are positioned a predetermined distance from the rearward end 22 of the platform 10, and a handle 24 extends upwardly from the rearward end behind the stop members 20.

The carrier apparatus for actually engaging the load includes sidebars 26, support blocks 28, hinges 30, and pivot rods 32. The sidebars 26 are fixedly attached in longitudinal position on opposite sides of the transporter below the top surface of the platform 10, and are connected by the hinges 30 to the support blocks 28. The longitudinal pivot rods 32 in the hinges 30 allow pivotal movement of the support blocks 28 relative to the fixed sidebars 26. In the exemplary form, a portion of the support blocks 28 extends rearwardly of the stop members 20 and are connected to levers 34 for lowering and raising the support blocks. The use of laterally displaced support blocks assures proper stability in balancing the load, and also allows mounting to be accomplished on the outer edges of the platform without interfering with the air bearing member.

In normal operation, the operator moves the levers 34 to pivot the support blocks 28 about the pivot rods 32 through approximately 180° to a position below the top surface of the platform. The air bearings 12 are then inflated and the transporter is moved freely in a generally longitudinal direction underneath a load such as 36 (See FIG. 5) by pushing the handle 24 until the rearward edge of the load abuts against the stop members 20. The air supply is turned off in order to deflate the air bearings 12 and allow the transporter to rest on bars 16, thereby increasing the space between the top surface of the platform 10 and the underside of the load 36. The levers 34 are still accessible in their positions behind the rearward end of the load and are actuated to rotate the support blocks 28 into raised position overlying and in supporting contact against the top of the sidebars 26 (See FIG. 4). The air supply is then turned on to inflate the air bearing and cause the support blocks 28 to engage the underside of the load (See FIG. 2). I claim as It will be appreciated by those skilled in the art that the foregoing structure of the exemplary embodiment provides a low profile transporter with support blocks 28 movable to a position out of the way below the top surface of the transporter while the transporter is moved on an inflated air bearing member under and independent of the load. The support blocks 28 can then be easily raised into load engagement position above the top surface of the platform while the transporter is resting on the deflated air bearing member underneath the load.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

Iclaimas my invention:

1. A transporter having a generally rectangular base with sides and a top surface and movable on an inflatable air bearing member and including in combination:
   carrier means attached to said transporter along opposite sides of said base for engaging a load, said carrier means being pivotable to a position below the top surface of the transporter while the transporter is moving on the inflated air bearing member under and independent of the load; and
   control means connected to said carrier means for pivoting said carrier means through 180° between a lowered position below said top surface of the transporter and an upper position extending above said top surface while the air bearing member is deflated.

2. A transporter having a base with a top surface and movable on an inflatable air bearing member and including in combination:
   carrier means attached to said transporter for engaging a load, said carrier means being positionable below the top surface of the transporter while the transporter is moving on the inflated air bearing member under and independent of the load, and including a pair of longitudinal support blocks mounted on opposite sides of the transporter for pivotal movement about a longitudinal axis;
   control means connected to said carrier means for raising said carriermeans above said top surface while the air bearing member is deflated;
   a handle on the reerward end of the transporter; and
   stop means on said top surface for keeping the load a predetermined minimum distance from said rearward end; and
   wherein said control means includes a manually actuated lever means located rearwardly from said stop means for lowering and raising said longitudinal support blocks.

* * * * *